Figure 1:
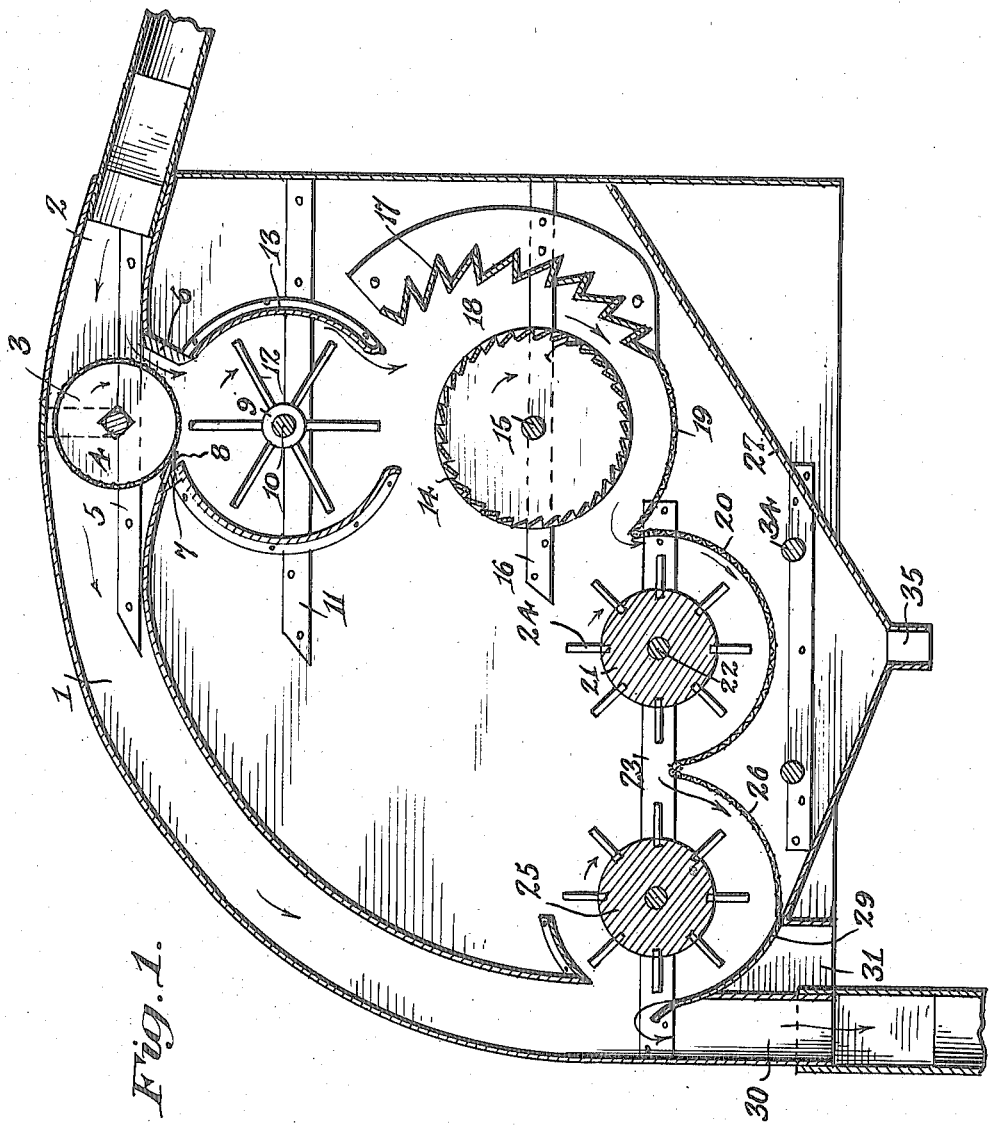

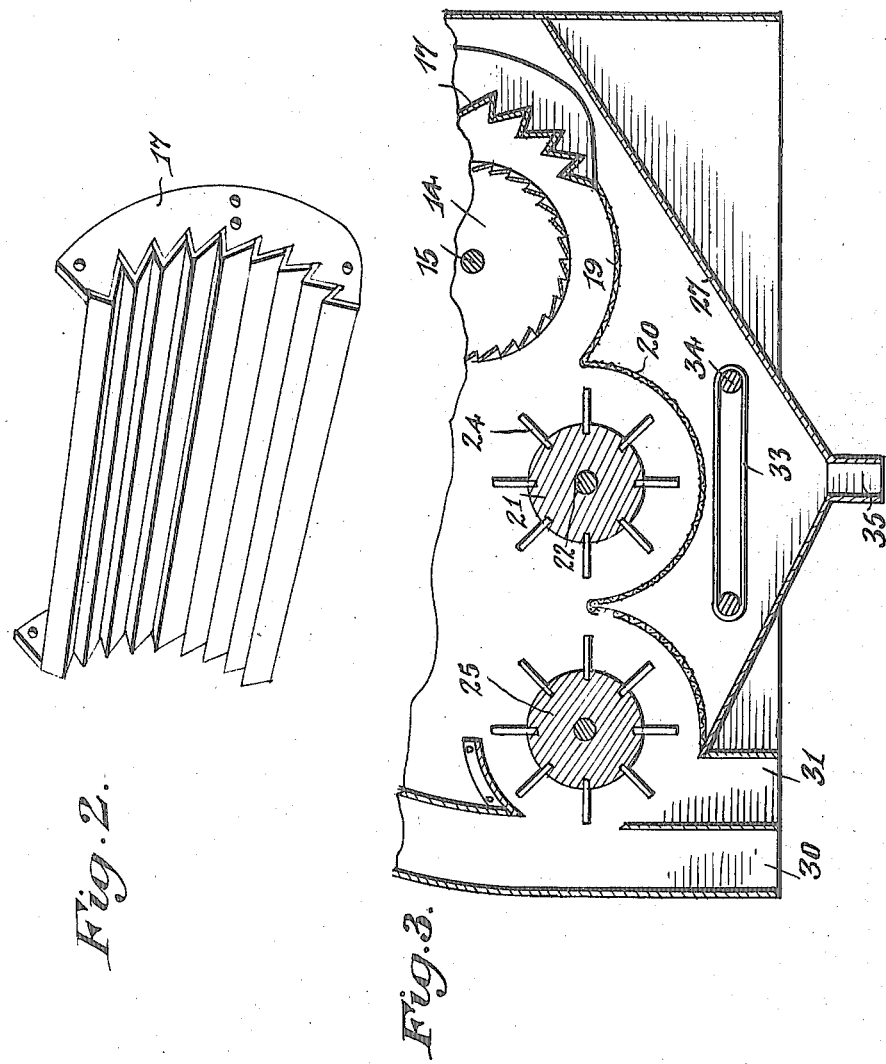

Patented Feb. 20, 1923.

1,445,755

UNITED STATES PATENT OFFICE.

JOHN L. CASSEL, OF WINSBORO, TEXAS.

COTTON-TREATING MACHINE.

Application filed October 14, 1921. Serial No. 507,669.

*To all whom it may concern:*

Be it known that I, JOHN L. CASSEL, a citizen of the United States, residing at Winsboro, in the county of Wood and State of Texas, have invented certain new and useful Improvements in Cotton-Treating Machines, of which the following is a specification.

This invention relates to cotton treating machines and more particularly to an apparatus which is an improvement upon the device described in my Patent No. 1,291,763 granted January 21, 1919 and the device described in my Patent Number 1,332,425 granted March 2, 1920.

The general objects of this invention are to provide a machine for treating and cleaning bolly cotton or any low grade cotton by means of a rolling process, to provide a machine which will so separate the dirt and shale from the cotton so as to provide a better grade of cotton by virtue of the fact that it is fluffed and thoroughly cleaned by the rolling process.

An important object of the invention is to provide a screen roller in the delivery passage of the machine so as to force the raw cotton into the vacuum roller without disturbing the same in any way and at the same time allowing a current of air to pass therethrough.

The above and additional objects are accomplished by means as are illustrated in the preferred embodiment and in the accompanying drawings, wherein like characters denote like and corresponding parts throughout the several views, in which:

Figure 1 is a longitudinal section through the apparatus constructed in accordance with my invention, Figure 2 is a detailed perspective view of the corrugated concave, and Figure 3 is a fragmentary longitudinal section through the lower portion of the apparatus.

Referring to the drawing in detail it will be seen that an air passage 1 is provided having the mouth 2 for receiving the cotton in its raw state. A screen roller 3 mounted on the shaft 4 which is journalled in the bracket 5 is disposed in the path of the air current passing through the passage 1. This screen roller 3 is formed by a plurality of disks fixed to the shaft 4 and having a cylinder of screen material thereover. A block 6 is disposed transversely of the machine forwardly of and slightly spaced from the roller 3 so as to allow the cotton to pass between the roller and itself. Another block 7 is situated to the rear of the roller 3 and a flexible member 8 is mounted thereon so as to impinge against the roller 3 and forces from engagement therewith any cotton which sticks thereto. This roller 3 rotates, as shown in the drawing, in a clock-wise direction and forces the raw cotton in engagement with the vacuum roller indicated generally at 9. This roller 9 is mounted on the shaft 10 journalled in the bracket 11 and comprises a drum having a plurality of slats 12 radiating therefrom so as to form pockets for receiving the cotton and delivering the same to the main roller. A pair of concaves 13 are arranged at the forward and rear end of the roller 9 in comparatively close proximity thereto so as to diminish the current of air which might tend to pass therethrough. A corrugated roller 14 mounted on the shaft 15 which is journaled in the brackets 16, is disposed immediately below the roller 9 and has associated therewith a corrugated concave 17 which is situated so as to co-operate with the roller 14 in such a manner that its upper end is farther from the periphery of the roller than its lower end thereby forming a tapering passage 18 through which the cotton passes at which time the balls are broken. This corrugated or main roller 14 also rotates in a clock-wise direction with the rollers 3 and 9. A curved screen 19 is disposed immediately below the roller 14 and is arranged concentric with its periphery and touches the end of the curved screen 20 which is concentric with the periphery of the roller 21. This roller 21 consists of a drum mounted on the shaft 22 journaled in the bracket 23 and is provided with a plurality of radiating slats 24. A similarly constructed roller 25 is situated to the rear thereof and has a concentrically arranged curved screen 26 associated therewith. It will be noted that the screens 20 and 26 are closer to their respective rollers than the screen 19. These rollers 21 and 25 will cause a current of air as they rotate in a clock-wise direction thereby forcing the foreign material from the cotton through the screens 20 and 26 into the hopper 27. A plate 29 is disposed beneath and to the rear of the roller 25 so as to lead the cotton out into the passage 1 so that the current of air may force the same through the outlet 30. This plate 29 is removed, as shown in Figure 3 so that the cotton may pass through the passage 31 when a belt delivering mechanism is used as will be understood by those skilled in the art.

A belt 33 movable on the rollers 34 journalled in the brackets 35 is disposed transversely of the hopper 27 immediately below the roller 21 for the purpose of distributing the foreign material forced from the cotton and preventing the same from becoming clogged in the outlet 35.

The foregoing description and accompanying drawings have reference to what might be considered to be the approved or preferred form of my invention. I desire it to be understood that I may make such changes in construction, combination and arrangement of parts as fall within the invention as hereinafter claimed.

Having thus fully described my invention what I claim as new and desire to secure by Letters Patent, is:—

1. In combination, a roller supporting structure, including a feed opening, a screen roller disposed in the opening, a pair of concaves situated in the structure below the screen roller, a vacuum roller rotatable between the concaves, a corrugated roller rotatable below the vacuum roller, a corrugated concave associated therewith, a foraminous screen disposed across the structure adjacent its lower end, means for rolling the cotton thereover, and a hopper formed below the foraminous screen.

2. In combination, a roller supporting structure including a feed opening and a recess communicating therewith, a screen roller situated in the opening, a vacuum roller disposed in the recess, a main roller below said vacuum roller, a concave associated therewith, a screen situated below the main roller and curved concentrically therewith, a second screen associated therewith, an auxiliary roller associated with the second screen, said second screen being concentric therewith, a third screen associated with the second screen, a second auxiliary roller associated therewith, said structure being provided with two outlets, and means for normally closing one of said outlets.

In testimony whereof I affix my signature in presence of two witnesses.

JOHN L. CASSEL.

Witnesses:
B. A. Cox,
L. T. Harrison.